PULSE COUNTING DEVICE WITH VISUAL AND ELECTRICAL STORAGE AND READOUT

Filed May 31, 1963 4 Sheets-Sheet 1

Inventors,
Donald M. Ham,
Fin Serck-Hanssen,
by Francis K. Doyle
Their Attorney.

Inventors,
Donald M. Ham,
Fin Serck-Hanssen,
by Francis K. Doyle
Their Attorney.

PULSE COUNTING DEVICE WITH VISUAL AND ELECTRICAL STORAGE AND READOUT
Filed May 31, 1963
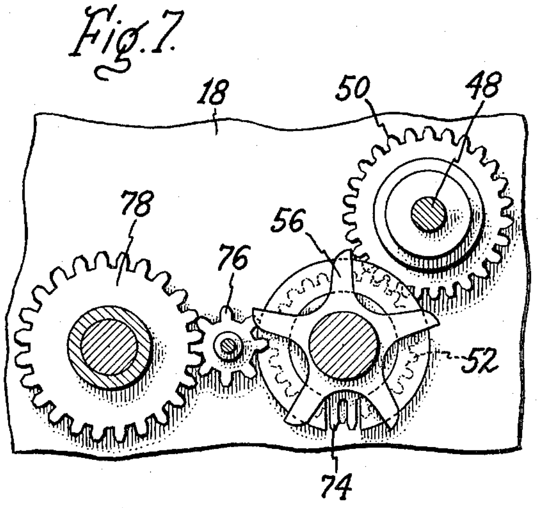
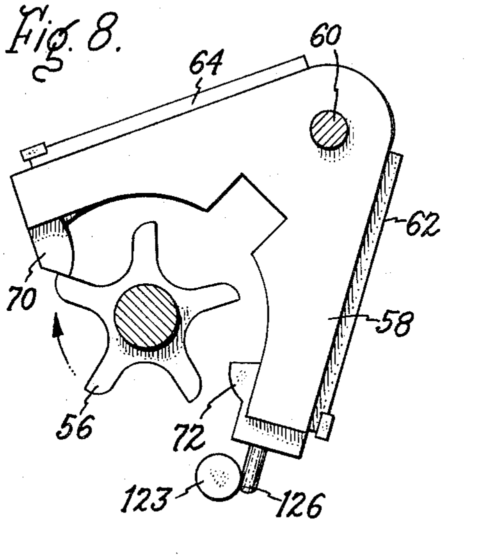
Fig. 9.
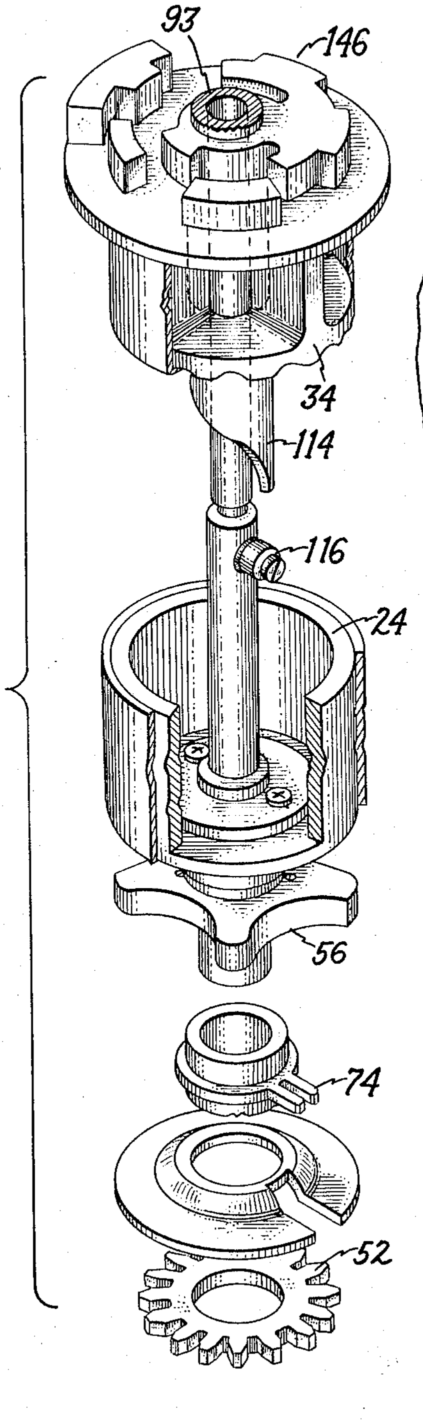
Inventors,
Donald M. Ham,
Fin Serck-Hanssen,
by Francis K. Doyle
Their Attorney.

Feb. 14, 1967 D. M. HAM ETAL 3,304,414

PULSE COUNTING DEVICE WITH VISUAL AND ELECTRICAL STORAGE AND READOUT

Filed May 31, 1963 4 Sheets-Sheet 4

Inventors,
Donald M. Ham,
Fin Serck-Hanssen,
by Francis K. Doyle
Their Attorney.

3,304,414

PULSE COUNTING DEVICE WITH VISUAL AND ELECTRICAL STORAGE AND READOUT

Donald M. Ham, Rochester, N.H., and Fin Serck-Hanssen, Oslo, Norway, assignors to General Electric Company, a corporation of New York Filed May 31, 1963, Ser. No. 284,688
17 Claims. (Cl. 235—92)

This invention relates to pulse counting devices and, more particularly, to a pulse counting device having visual and electrical storage and readout.

As is well known to those skilled in the art of data logging applications, pulse counting devices are utilized as a component of various systems which require data logging. Examples of such systems include various types of telemetering systems and computer control process systems. In most systems applying data logging the pulse counting device is used to count measurable quantities such as, kilowatt hours, gallons, tons, cubic feet of gas, linear yards of cloth, wire, paper and similar quantities. In most data logging systems these quantities are generally counted numerically, usually by means of a digital counter, with the numerical count being translated to a binary code for use in telemeter systems or computer control processes or the like.

In most present day counting devices the output of the device must be read instantaneously, generally, in its digital form, transferred or translated to a binary coding device and then utilized immediately in the process or system. Obviously, while a reading is being taken it is necessary that the counting process be halted or delayed during readout to prevent any change in the reading during such readout. However, the halting or delaying of the counting process generally leads to a loss of any counts which may be generated during readout. The number of counts being lost generally depends on the time required for the readout. Further, most pulse counting devices do not provide for a storage of the quantity being read since immediately after reading the device continues counting the specified quantities, thus changing the reading. In these devices it is not possible to readily check the operation of the process being counted without recourse to the controlling apparatus. It has been found desirable to provide both a visual and electrical storage of each count readout, between readouts, for purposes of comparing a present count with the previously read count, to check the continued operation of the process being counted. It is also desirable to provide a counting device which can be readily readout as desired without loss of any counts during the readout operation.

It is, therefore, one object of this invention to provide a pulse counting device which is provided with electrical storage and readout means.

It is a further object of this invention to provide a pulse counting device which has a visual storage.

A further object of this invention is to provide an electro-mechanical pulse counting device which may be electrically read without loss of any incoming pulse counts.

Yet another object of this invention is to provide an electro-mechanical pulse counting device which provides all of the desired functions in a compact, relatively low cost device.

In carrying out this invention in one form a pulse counting device is provided which comprises a pair of visually readable registers. One register is utilized to accumulate the incoming pulses on a continuing non-resettable basis. The second register is arranged with respect to the first such that upon receipt of a transfer signal the numerical value on the first register is transferred to the second register and remains in storage on such second register until the next transfer signal is received. Electrical means are provided in conjunction with the second register to enable electrical readout of the second register in a binary coded form. The transfer of the reading from the first register to the second register is accomplished in a time period such that only a single count can be received during such transfer. Means are provided in the counting mechanism of the first register to delay such count until the transfer is completed and then to add such count to the first register.

The invention which it is desired to protect is particularly pointed out and distinctly claimed in the claims appended hereto. However, it is believed that this invention and its objects and advantages, as well as other objects and advantages thereof, will be more clearly understood from the following detailed description of a preferred embodiment thereof, especially when considered in the light of the accompanying drawings, in which:

FIGURE 7 is a top detailed view, partially in section, of a portion of the counting means used in the first or counting register, taken on the line 7—7 of FIG. 4;

FIGURE 8 is a detailed view, partially in section, of a preferred form of escapement mechanism used with the counting means of FIG. 7;

FIGURE 9 is an exploded perspective view, partially in section, of one cooperating dial of each of the registers of the counting mechanism shown in FIG. 1.

Reference will now be made to the drawings, in which like numerals are used to indicate like parts throughout the various views thereof, for a complete description of a present preferred embodiment of the pulse counting device of this invention. However, it will be understood that this description is for illustrative purposes only and that the invention is not limited thereto, other than as indicated in the claims appended hereto.

Figures 1, 2:
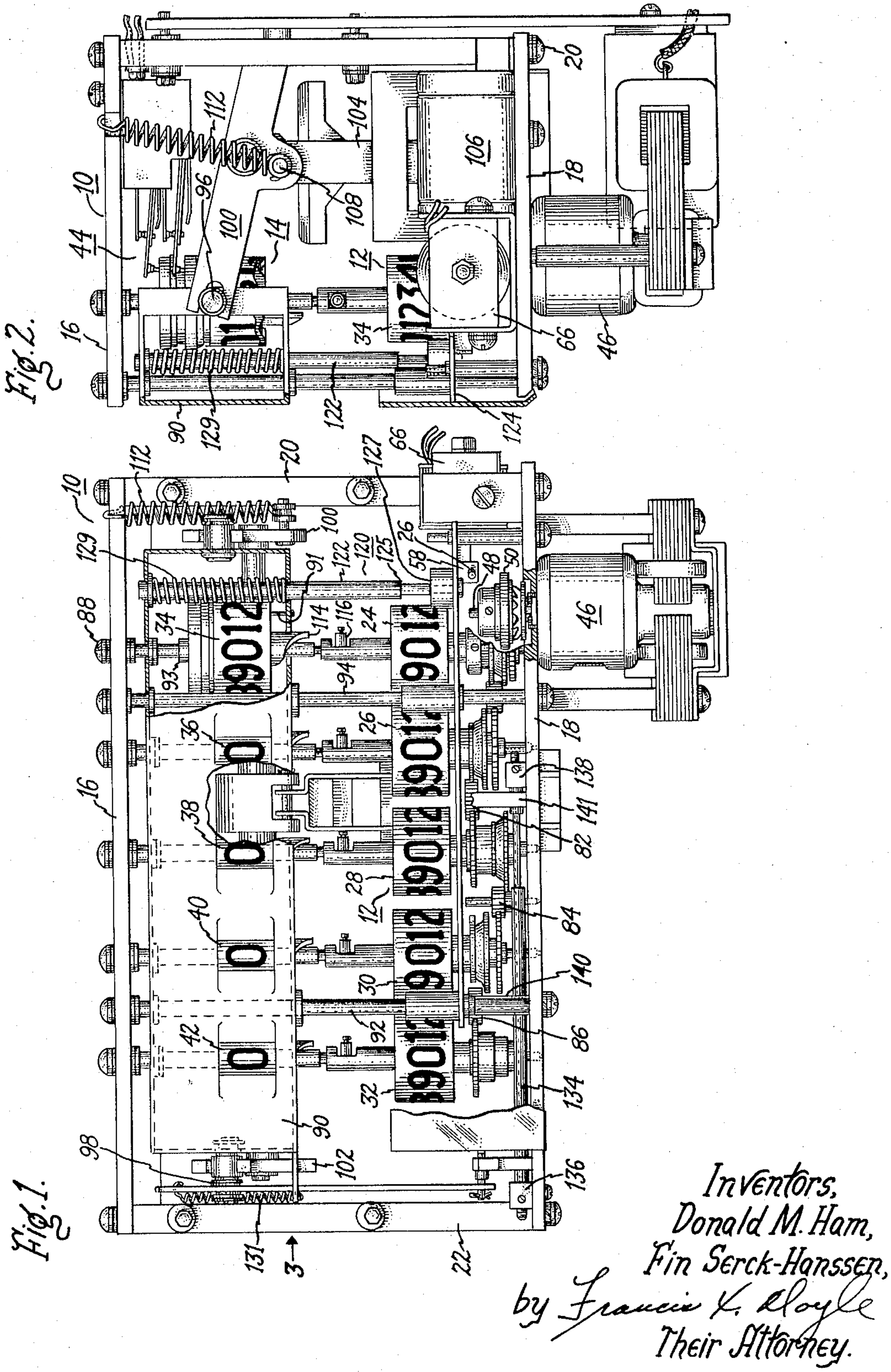
FIGURE 1 is a front view, with portions broken away, of a pulse counting device made according to this invention showing the present preferred embodiment of the invention.
FIGURE 2 is a side view of the pulse counting device shown in FIG. 1.

Referring first to FIGS. 1 and 2 of the drawings, a pulse counting device, according to the preferred embodiment of this invention, is shown and designated as 10.

The pulse counting device 10 comprises a first register 12 and a second register 14, which are enclosed between the top and bottom members 16 and 18. The upper and lower members 16 and 18 are spaced apart by means of spacers 20 and 22 on opposite sides thereof. The first register 12 is mounted in the lower portion of the enclosure formed by the top and bottom members 16 and 18 and comprises, in the preferred embodiment, five separate digital dial members indicated as 24, 26, 28, 30 and 32. As will be understood, the digit dial 24 may be the units dial, with each of the other dials being of the next higher order of numbers above the preceding dial. In a similar manner, the second register 14 is placed in the upper portion of the enclosure formed between the upper member 16 and the lower member 18 and is also provided with five separate dials, indicated as 34, 36, 38, 40 and 42. As will be understood, the second register 14, which is indicated as the upper register, is the storage register and the dial 34 is the units dial with the remaining dials in the ascending order in a similar manner as the dial members of the lower register 12.

Briefly, the operation of the pulse counting device is as follows. The counts which are generated exteriorly of the pulse counting device are counted into the first or the lower register 12, each of the higher order dials being actuated through the unit dial 24 to count the number of pulses which are received. As will be understood, the lower register will indicate the exact number of pulses which have been counted into the register at any given moment. At a transfer signal, which is generated externally of the pulse counting device by means of a clock or other external source (not shown), the second register 14 will be actuated so as to be pulled down above the lower register 12 and in its downward movement, by means of camming mechanisms, which will be hereinafter described, is caused to have each of its dial members rotated so as to provide an indication of the numerical value which is registered in the lower register 12. At the end of the downward movement the upper register is released and returns to its resting point, shown in FIG. 1, and upon return will be seen to have the identical reading as was in the lower dial when the transfer signal was received. When the upper dial returns to its upper or at-rest position, shown in FIG. 1, the reading of the lower dial will have been stored into the upper or second register 14 and will provide both a visual and electrical storage of the reading which has been read out of the first or lower register 12. Electrical readout means are provided in the form of contacts, indicated at 44 in FIG. 2, which cooperate with raised portions on the top of the dials 34, 36, 38, 40 and 42 of the upper register 14 to provide a binary coded electrical readout of the numerical value indicated by the dials of the upper register 14. Thus it will be seen that by means of the pulse counting device of this invention any numerical quantity can be counted into the lower register of the pulse/counting device 10 and at a given transfer signal such count will be automatically transferred into the second or upper register 14 where it will be visually available for storage and readout purposes and also electrically stored for readout purposes. The readout count will be stored in the upper register until the next transfer signal is received.

Having briefly described the over-all operation of the pulse counting device of this invention, there will now be described the particular detailed operation of the counting into the lower or first register 12 of the pulse counting device. As can be seen from FIG. 1, a motor 46 is provided, mounted below the lower plate 18, with its shaft 48 extending through the lower member 18. Mounted on the shaft member 48 is an output gear 50. As will be understood, the motor 46 is continuously energized and drives its output shaft 48 at a synchronous speed of 60 revolutions per minute unless it is restrained. The output gear 50 of motor 46 meshes with the gear member 52 which is mounted on the shaft 54 of the first dial 24 of register 12. This is more clearly shown in FIG. 4 of the drawings, inasmuch as the gear member has been broken away in FIG. 1 to more clearly show the mounting of the motor 46 into the lower member 18 of the pulse counting device 10. As will be apparent from FIG. 4 of the drawings, the dial members 24 of the first register 12 is pinned to shaft 54 so as to rotate therewith and is rotatable with the rotation of the gear 52 which is similarly fixed on to the shaft 54 of the first dial 24. Thus, as will be understood, as the motor 46 rotates it drives the output gear 50 which in turn meshes with gear 52 so as to drive the dial member 24.

Figure 10:
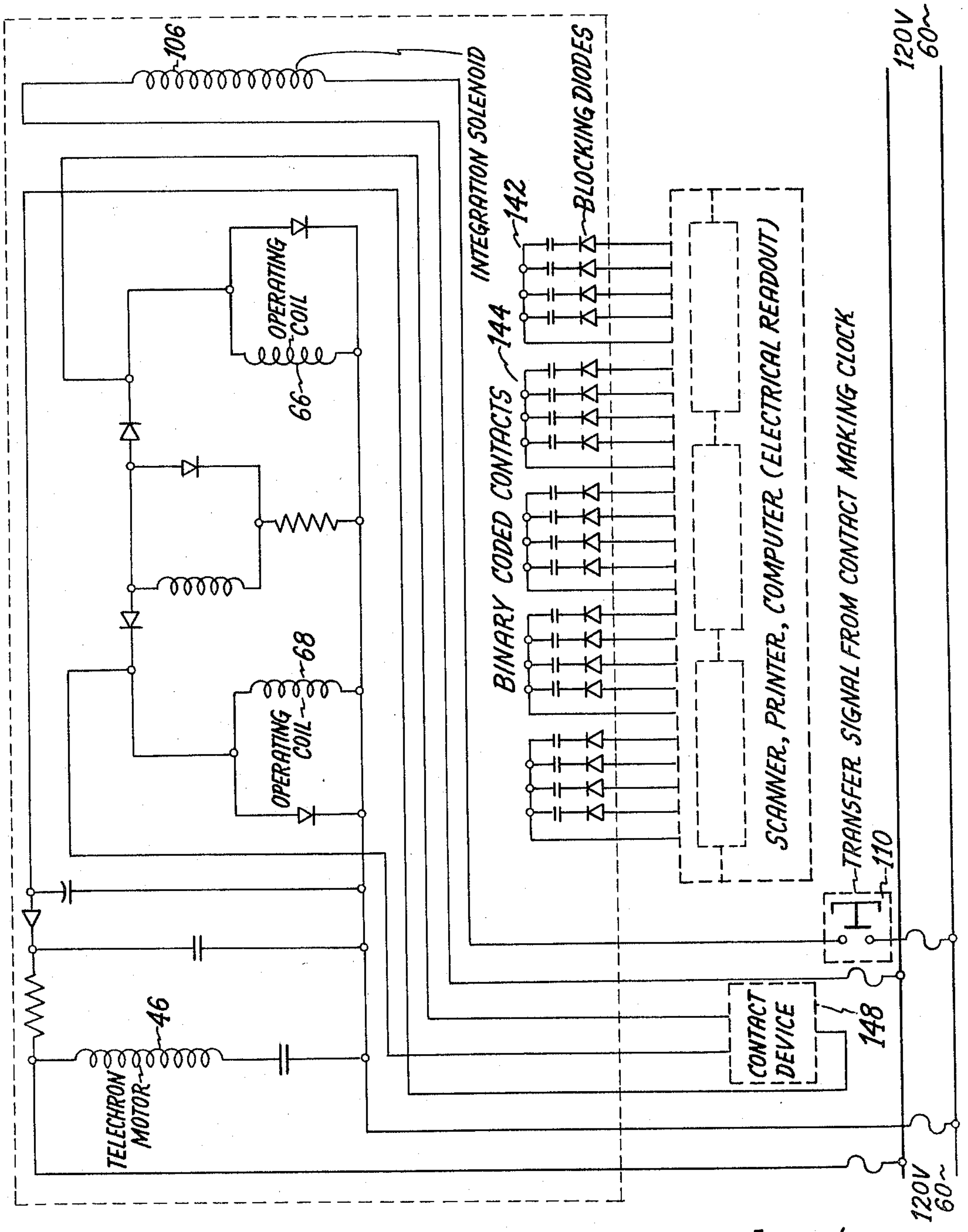
FIGURE 10 is a schematic circuit diagram of the preferred electrical circuit system of the pulse counting device of this invention.

To prevent the dial member 24 from being driven continuously by the continuously operated motor 46, a star wheel 56 is provided which is similarly fixed on to the shaft 54 of the dial member 24. The star wheel 54 is provided with five teeth, as is shown in FIGS. 7 and 8 of the drawings, each of the teeth being spaced 72° apart. An escapement mechanism 58 is provided which is mountted on a shaft member 60 which is securely fixed to the lower plate member 18. The escapement mechanism 58 is provided with a pair of armatures 62 and 64 on opposite sides of the escapement, as indicated in FIG. 8. These armatures are attracted by the solenoids 66 and 68, as is indicated in FIG. 10, only one of these solenoids being shown in FIGS. 1 and 2. As the armatures are attracted to the solenoids the tooth members 70, 72 are moved out of and into blocking relation to the star wheel 56, in the manner indicated in FIG. 8. In other words, when solenoid 68 is operated it attracts armature 64, moving tooth 70 out of engagement with the star wheel 56. The same movement moves the tooth 72 into engaging relation with the star wheel 56. However, as will be evident from FIG. 8 of the drawings, as the tooth 70 moves out of engagement and tooth 72 moves into engaging relation with the star wheel 56 the star wheel 56 is allowed to rotate 36° before a tooth of the star wheel engages the tooth 72 of the escapement mechanism 58. Of course, when the opposite solenoid 66 is energized, armature 62 is attracted, thereby moving the escapement device 58 into the position shown in FIG. 8, thus, removing tooth 72 from engagement with the star wheel and moving tooth 70 back into engaging relation with the star wheel. Again, as will be evident, the star wheel will rotate 36° before a tooth of the star wheel engages the tooth 70 of the escapement mechanism 58. The solenoids 66 and 68 are energized by external contact means alternately so as to provide the desired counting into the unit counting dial 24 of the lower or first register 12. Of course, it will be evident to those skilled in the art, that the release of the star wheel 56 for a rotation of 36° will allow the driving wheel 50 of motor 46 to drive gear 52 of dial 24 through 36° so as to rotate dial 24 from one number to the next succeeding number. From the above it will be evident that by means of motor 46 the output gear 50, the driven gear 52 of dial 24, the star wheel 56, the escapement mechanism 58 and solenoids 66 and 68 that the lower register 12 may be provided with a count for each pulse, which is utilized to alternately energize the solenoids 66 and 68 of the pulse counting mechanism.

The accumulation of the count into the higher order dials 26, 28, 30 and 32 is obtained through a transfer gearing system utilizing mutilated gears, in the manner which is well known to those skilled in this art. Briefly, the accumulation of counts from dial 24 to dial 26 will be described with reference to FIGS. 4 and 7, it being apparent to those skilled in the art that similar gearing is provided between the adjacent dials 28, 30 and 32.

Figures 3, 4, 5:
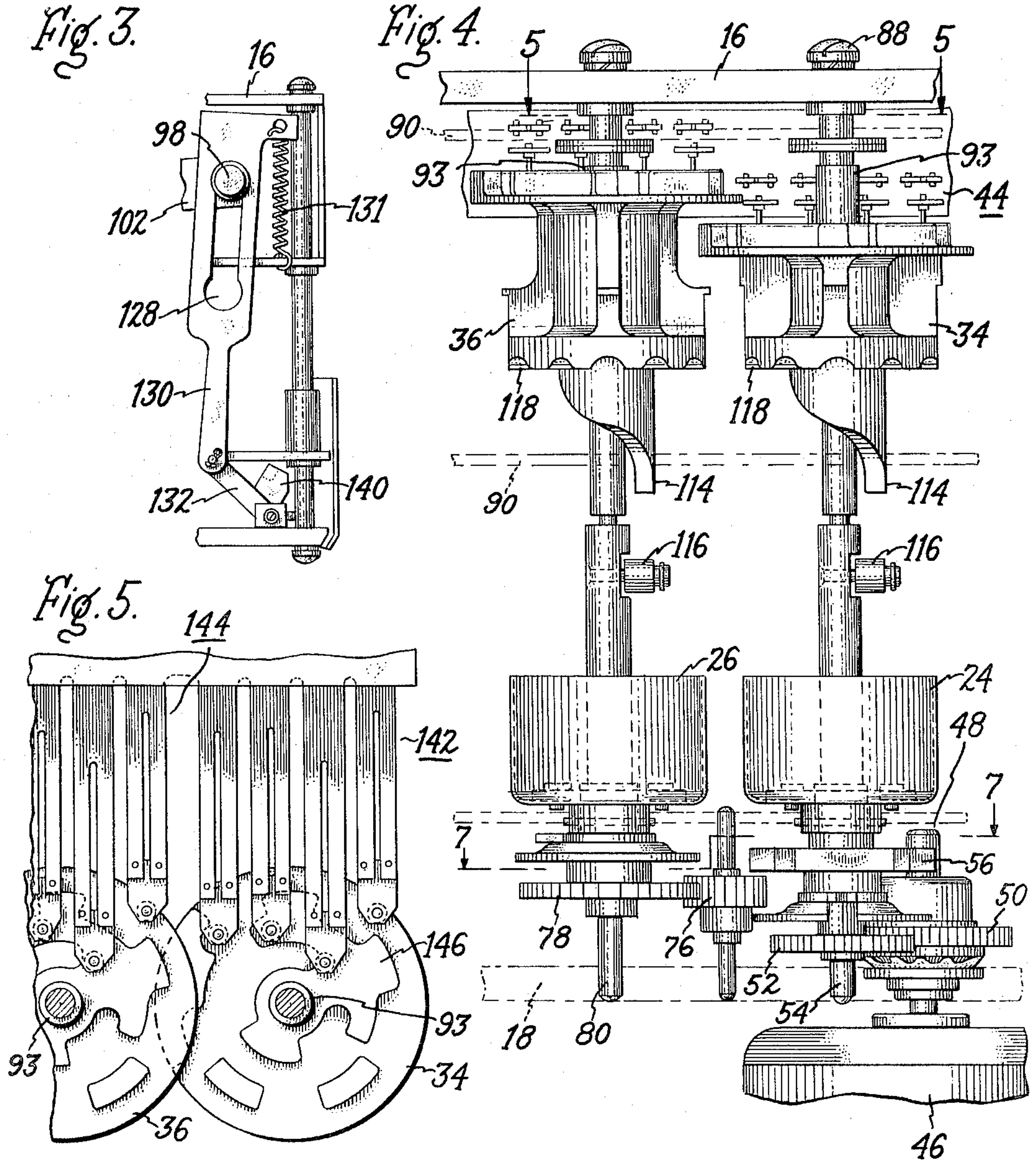
FIGURE 3 is a detailed view of a portion of the device of FIG. 1, looking in the direction of the arrow 3 in FIG. 1.
FIGURE 4 is a detailed front view of some of the cooperating portions of the two registers used in the pulse counting device of FIG. 1.
FIGURE 5 is a view of the preferred form of electrical readout taken on the line 5—5 of FIG. 4.

Referring now to FIGS. 4 and 7 of the drawings, it can be seen that a transfer gear 74 is provided fixed to the shaft 54 of tfhe unit dial 24. The transfer gear 74 has a single pair of teeth, as indicated in FIG. 7. As the dial 24 is rotated from zero through 9, the transfer gear makes an approximate complete rotation and is in position to mesh with a connecting gear 76 which is mounted between the first dial 24 and the second dial 26, as indicated in both FIGS. 4 and 7 of the drawings. As unit dial 24 moves from the 9 back to the zero position, thus indicating a tenth pulse being counted, the transfer gear 74 meshes with the gear 76 and rotates gear 76 through a partial revolution. Gear 76 is in turn meshed with the driving gear 78 which is fixed to the shaft 80 of the second or tens dial 26. As the connecting gear 76 rotates through a partial revolution it drives the gear 78 through a 36° arc, thereby rotating dial 26 from a zero position to a one position thereby accumulating a count of 10 into the tens dial 26. Obviously, as the units dial 24 rotates through a second complete revolution, thereby accumulating a second count of 10 pulses, the transfer gear 74 will again contact connecting gear 76 to again rotate the gear 78 of dial 26 through another 36° arc thereby rotating dial 26 to a second position to indicate a second accumulation of a ten count. As will be well understood by those skilled in the art, in a similar fashion the connecting gear 82 between dial 26 and dial 28 is also driven once in each revolution of dial 26 to rotate dial 28 through a 36° arc to indicate a hundred count. The connecting gear 84 between dials 28 and 30 is also actuated once each revolution of dial 28 to move dial 30 through a 36° revolution, while the connecting gear 86 between dials 30 and 32 is actuated once for each revolution of dial 30 to rotate dial 32 through a 36° revolution. Thus, as will be understood, the gear train connecting each of dials 24, 26, 28, 30 and 32 is actuated to accumulate within the dials of register 12 the pulse count which is used to alternately energize the solenoids 66 and 68, in the manner hereinbefore described. Thus, it will be apparent, that the register 12 will accumulate within its dials 24, 26, 28, 30 and 32 the continuing count obtained from the incoming pulses.

There will now be described the operation of the pulse counting device 10 in transferring the reading from the first or lower register 12 into the second or upper register 14 to obtain the desired electrical and visual storage readout of the count of the first or lower register 12. As will be apparent from FIG. 1 of the drawings, each of the dials 24, 26, 28, 30 and 32 of the first or lower register 12 is mounted on a separate shaft which extends from the lower plate 18 to the upper plate 16. Each of the shafts is rotatably mounted in bearing members, indicated for example at 88 in FIG. 1. Thus it will be understood that each of the shafts is rotatably mounted between the upper member 16 and the lower member 18 so that the lower dials of the register 12 may be driven through the gear train hereinbefore described. The upper register 14 comprising the dials 34, 36, 38, 40 and 42 includes a casing member 90 which is movably mounted on the fixed rods 92 and 94 which are firmly and immovably fixed between the upper plate 16 and the lower plate 18. Each of the dials 34, 36, 38, 40 and 42 of the second or upper register 14 is rotatably and slidably mounted on the shafts to which are fixed their comparable lower dials of the lower register 12. The casing 90 of the upper or second register 14 is mounted slidably on the guide shafts 92 and 94 and is provided with pin members 96 and 98 which are engaged in slots of arm members 100 and 102. Arm members 100 and 102 are connected to the armature 104 of the solenoid 106 by a shaft 108, as is more clearly seen from FIG. 2 of the drawings. At the receipt of a transfer signal through the transfer contact 110, shown in FIG. 10, the solenoid 106 is energized thereby pulling the armature 104 downward against the force of the springs 112, only one of which is shown in FIGS. 1 and 2 of the drawings. As armature 104 is pulled downwardly arms 100 and 102 are pulled in a downward direction through the shaft 108. In moving downward arms 100 and 102 acting through pins 96 and 98 move register 14, casing 90 and the dial members 34, 36, 38, 40 and 42 downwardly toward the first or lower register 12. As earlier discussed each of dial members 34, 36, 38, 40 and 42 is movably and rotatably mounted on the shafts extending from the upper member 16 to the lower member 18 and, therefore, freely move downwardly with the casing 90 of the register 14. As casing 90 and dial members 34, 36, 38, 40 and 42 move downwardly the cams 114 on each of the dial members 34, 36, 38, 40 and 42 will contact the rollers 116 which are mounted on each of the lower dial shafts, as is indicated in FIG. 1 of the drawings. As the cams 114 contact the rollers 116 each of the dial members is lifted from the detent members or pins on the bottom of the casing or carriage 90 and tends to float within the carriage. Only one of the detent or pin members is shown at 91 in FIG. 1, as used with dial member 34. However, on further movement of the carriage 90, the upper portion of the carriage contact the bushings 93 of the dial members forcing them downwardly causing them to be cammed about the roller member 116. This action can be more clearly seen in FIG. 4 of the drawings where the upper and lower units and tens dials 24, 26, 34 and 36 are shown. As will be apparent, as the upper portion of the carriage or casing member 90 contacts the bushing 93 upper shoulder of the units dial 34 and the tens dial 36 it will force the units dial 34 and the tens dial 36 down about the contact roller 116 and, due to the shape of cam member 114, will cause the units dial 34 and the tens dial 36 to be rotated about the shaft 80, thereby causing the dials 34 and 36 to assume the same numerical position as the units dial 24 and the tens dial 26. The upper dials will be rotated about the shafts 54 and 80 until one of the detents, indicated at 118 of each of the upper dials contacts the roller 116 on each of the shafts 54 and 80. When the detents are in contact with the rollers 116 then each of the upper dials will have been rotated to indicate the same value as has been counted into the lower dials 24 and 26. Of course as will be understood the same reaction will be obtained with dials 38, 40 and 42, such that at the end of the carriage movement in the downward direction each of dials 34, 36, 38, 40 and 42 will have been rotated by means of cam 114 and rollers 116, such that each of the upper dials will indicate the same value as has been counted into each of the lower dials 24, 26, 28, 30 and 32. At this point, the transfer signal is removed from the solenoid 106 thereby allowing the springs 112 to return the arms 100 and 110 to the upper position, indicated in FIGS. 1 and 2, thereby carrying the upper dials and the carriage 90 back to their upper or storage position. As will be evident, as the carriage 90 is lifted from the lower position the bottom of the carriage contacts the bottom of dial members 34, 36, 38, 40 and 42 and the pins 91 on the base of the carriage 90 contacts the detents 118 on each of the upper dial members thereby holding such dial members to prevent the dial members from being moved by vibration, or otherwise, from the values obtained from the lower dials.

When the transfer signal is obtained it is desirable that the lower dial members be locked in their position and that the counting mechanism be delayed momentarily to prevent any change of the count in the lower dials during the transfer of the count from the lower dials of the first register 12 into the upper dials of the second register 14. In order to obtain this desired delaying of the counting mechanism and the locking of the lower dials a lock member is provided, as will now be described, to delay any action of the counting mechanism during the transfer of the reading from the first register 12 to the second register 14. A lock member 120 is provided in the form of a shaft which is movable into and out of locking engagement with the escapement mechanism 58 through the action of the carriage 90 of the upper register 14. As can be seen from FIGS. 1 and 2, the lock member 120 comprises a shaft 122 which is spring mounted within the carriage 90 and has a portion 123 which extends through a plate member 124 which is mounted below the lower dials 24, 26, 28, 30 and 32 of the first register 12. As will be apparent from FIGS. 1 and 2, as carriage 90 is moved into a downward direction the shaft portion 123 is pushed through the plate member 124, the end of the shaft moving into locking engagement with a pin 126 on the end of the escapement mechanism 58, as will be more clearly apparent from FIG. 8 of the drawings. As will be apparent, when the shoulder 125 on shaft 122 contacts shoulder 127, spring 129 will be compressed during further downward movement of carriage 90. As long as the carriage 90 is in the downward position, the shaft portion 123 is in locking relation to the pin 126 and will prevent operation of the escapement mechanism 58 in either direction, according to the position of the escapement mechanism at the time that the transfer signal is received. As will be understood, when either the solenoids 66 or 68 is energized during a transfer of the reading from the first register 12 to the second register 14, the shaft portion 123 will prevent the escapement mechanism from being pivoted. However, as soon as the carriage 90 is returned to the upper position the shaft 122 will be moved out of locking relation with pin 126 thereby allowing the escapement device to be pivoted in the direction of the energized solenoid. Thus, if the transfer action is taken during the time when only a single count may be received by the counting mechanism then no count will be lost, for as the transfer of the reading from the register 12 to the register 14 is being made the count which is registered in either of the solenoids 66 or 68 will retain the energization of such solenoid throughout the transfer operation, and at the completion of the transfer operation will actuate the escapement device to enter the count into the lower register 12. Thus, by properly timing the action of the transfer with the timing of the counting function the transfer mechanism may be operated and a count delayed and at the end of the transfer the count will automatically be placed into the lower register 12. In one preferred embodiment of this invention, 3 pulses may be counted each second. Thus each solenoid is energized for approximately 335 milliseconds for each count. In the same embodiment the transfer operation was set to occur within a period of 200 to 250 milliseconds. With this timing, a count can be delayed during the entire transfer operation. At the end of such operation the solenoid would still be energized and would thus operate escapement 58 to count such pulse into the lower register.

In order to center the lower register 12 at the time of transfer, to prevent ambiguous readings due to excess backlash when lower dials are at their transfer position 9–0, a centering device is provided which is shown in detail in FIGS. 1 and 3 of the drawings. As can be seen from FIG. 3 of the drawings, the pin 98, which cooperates with the arm 102 to aid in lowering the carriage 90 and transferring the reading to the upper or second register 14, rides in a slot 128 of an arm member 130. The arm 130 is connected to carriage 90 by the spring 131 and is pinned to a lever 132 which in turn is fixed on to a shaft 134. The shaft 134 is rotatably mounted in bearing members 136 and 138 which are fixed in the lower member 18 of the pulse counting device 10. Also fixed on to the shaft 134 are centering mechanisms 140 and 141 which in their centering position engage the connecting gears 86 and 82 between dial members 30, 32 and 26, 28, respectively. As will be apparent from FIG. 3 of the drawings, as arm member 102 is moved in a downward direction, spring 131 pulls arm 130 in a downward direction. Movement of arm 130 downward pivots lever 132 in a counterclockwise direction, thereby rotating the shaft 134 and pivoting centering means 140 and 141 into centering engagement with the connecting gears 82 and 86. Thus, as will be seen as the carriage 90 is moved in a downward direction to transfer the reading from the first register 12 to the second register 14 the first register 12 is centered by means of centering members 140 and 141 to provide centering of the lower dials during the transfer operation.

Figure 6:
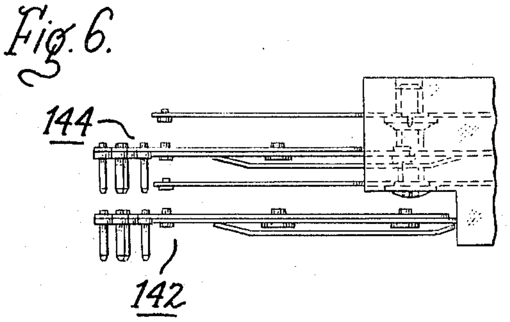
FIGURE 6 is a side view of the contacts shown in FIGS. 4 and 5.

From the above it is believed clear the manner in which the pulse counting mechanism operates to both count external pulses into the lower register 12, to transfer such readout, as desired, and provides for centering of the lower register 12 and locking of the counting escapement mechanism 58 during the transfer operation without loss counts into the upper register 14 for visual storage and of any count. There will now be described the means of obtaining the electrical readout from the second register 14 after a reading has been transferred from register 12 into register 14. As will be clear from FIGS. 4, 5, 6 and 9, especially, each of the upper dials 34, 36, 38, 40 and 42 is provided with a code disk mounted on the upper shoulder of the dial. The code disk is set up in a binary coded form, either a 1, 2, 4, 7 or a 1, 2, 4, 8 code, as desired. Of course it will be obvious that other types of binary codes may be provided, if desired. However, it has been found in the preferred embodiment that either the 1, 2, 4, 7 or the 1, 2, 4, 8 codes is preferable. Contact members 44 are provided for each of the upper dials as is indicated at 142 for dial 34 and 144 for dial 36 in the drawings. The contact members are each provided with four separate contacts in order to provide the desired binary code relation. Each of the code disks is provided with raised or lowered portions, in the manner indicated particularly in FIG. 9 at 146. The raised and lowered positions are coordinated with the digital figures on the dials 34, 36, 38, 40 and 42 and when in contacting relation with contact members 44, such as the contacts 142, 144 and the like, will provide a binary indication of the reading on each of the dial members 34, 36, 38, 40 and 42. As can be seen, especially in FIGS. 4 and 5, the contact 142 for the dial 34 is provided with four separate contact pins which engage the coded disk when the dial 34 is in its raised position. As the pin members contact either the raised portions 146 or the lower portions of the code disk on the dial member 34 the contact 142 will provide an electrical condition which can be sensed externally to indicate the position of the counter. In the device shown in FIGS. 4, 5 and 6 as the contact fingers of each of the contact devices 142, 144 and the like engage a raised portion 146 of the coded disk a contact will be closed whereas when no raised portion is engaged the contact will remain open. As is well understood by those skilled in the art, by means of the four contacts, which may remain open or closed according to the position of the raised portions 146 on each of the code disks on the upper portion of the dials 34, 36, 38, 40 and 42, an electrical signal will be provided in a binary coded form which will provide an indication of the dial position. Thus it will be apparent that as the register 14 is returned to the upper portion of the pulse counting mechanism 10 each of the coded disks will engage the various contact fingers of the contact mechanism for such coded disks to provide a binary coded electrical signal indicating the position of the particular dial member. Thus an electrical readout will be provided each time that the transfer is made from the lower register 12 to the upper register 14. Obviously, the binary coded electrical signals will be obtainable until the next transfer is made, thereby the reading of the upper dials will be stored through the contact members until a readout is electrically taken by means of a scanner, a printer, a computer or a similar device. Of course, the visual readout will be retained until the next transfer, inasmuch as the dial members 34, 36, 38, 40 and 42 will remain in their stored position until the next transfer is made. Thus it is seen that by means of the pulse counting device of this invention a visual readout is provided, as well as visual storage between transfers and, similarly, an electrical storage and readout is obtained through the contact mechanisms 142, 144 and the code disks, in the manner hereinbefore described.

FIGURE 10 provides a schematic circuit diagram which is used in the preferred embodiment of the invention hereinbefore set forth. As can be seen the motor 46 is connected directly across a source of alternating current such that the motor will be continuously energized. In a similar fashion, the solenoid 106 utilized in transferring the reading from the register 12 to the register 14 is connected across the source of alternating current. However, the contact member 110 is placed within one of the leads to the solenoid 106 whereby the solenoid will only be energized when a transfer signal closes the contact member 110. The solenoids 66 and 68 are connected by means of a contact device 148 which operates externally of the pulse counting device 10 of this invention, the operation of the contact device alternately energizing the solenoids 66, 68 in the manner hereinbefore described to cause operation of the escapement member 58 to provide the desired counting into the first or lower register 12. The binary coded contacts 142, 144 are also shown which will provide the desired binary coded electrical signal to a printer, computer or the like. As will be understood, blocking diodes may be provided between the binary coded contacts and the readout device, as indicated in FIG. 10, if desired, to prevent formation of sneak circuits which could present ambiguous readings to the readout device.

From the above it will be apparent that the pulse counting mechanism of this invention provides all the objects and advantages hereinbefore set forth. While the present preferred embodiment has been specifically described, it will be readily apparent to those skilled in this art that various changes may be made without departing from the spirit and scope of the invention defined in the appended claims.

What we claim as new and which it is desired to secure by Letters Patent of the United States is:

1. A pulse counting device provided with visual and electrical storage and readout comprising;

(a) a pair of visually readable registers disposed in an enclosure in the upper and lower portion thereof, (b) one of said registers being connected to a counting mechanism for accumulating incoming pulse counts, (c) the other of said registers providing visual and electrical storage and readout of counted pulses, (d) means interconnecting said registers to transfer the reading of said one register to said other register, (1) said means including camming means on said other register cooperating with contact means on said one register, (e) transfer means electrically actuated to operate said interconnecting means whereby the count accumulated in said one register is transferred to said other register.

2. A pulse counting device provided with visual and electrical storage and readout comprising;

(a) a pair of visually readable registers disposed in an enclosure in the upper and lower portion thereof, (b) one of said registers being electrically and mechanically connected to a counting mechanism for accumulating incoming pulse counts, (c) the other of said registers providing visual and electrical storage and readout of counted pulses, (d) means interconnecting said registers to transfer the reading of said one register to said other register, (1) said means including camming means on said other register cooperating with contact means on said one register, (e) transfer means electrically actuated to operate said interconnecting means whereby the count accumulated in said one register is transferred to said other register.

3. A pulse counting device provided with visual and electrical storage and readout comprising;

(a) a pair of visually readable registers disposed in an enclosure in the upper and lower portion thereof, (b) one of said registers being connected to a counting mechanism for accumulating incoming pulse counts, (c) the other of said registers providing visual and electrical storage and readout of counted pulses, (d) means interconnecting said registers to transfer the reading of said one register to said other register, (1) said means including camming means on said other register cooperating with contact means on said one register, (e) transfer means electrically actuated to operate said interconnecting means whereby the count accumulated in said one register is transferred to said other register, and (f) locking means interconnected with said transfer means for preventing operation of said counting mechanism, said locking means being actuated by said transfer means during transfer to prevent change in the reading of said one register.

4. A pulse counting device provided with visual and electrical storage and readout comprising;

(a) a pair of visually readable registers disposed in an enclosure in the upper and lower portion thereof, (b) one of said registers being connected to a counting mechanism for accumulating incoming pulse counts, (c) the other of said registers providing visual and electrical storage and readout of counted pulses, (d) means interconnecting said registers to transfer the reading of said one register to said other register, (1) said means including camming means on said other register cooperating with contact means on said one register, (e) transfer means electrically actuated to operate said interconnecting means whereby the count accumulated in said one register is transferred to said other register, and (f) a count saving mechanism to prevent loss of a count during transfer, (1) said count saving mechanism including a locking means to lock said counting mechanism during transfer and timing means whereby said transfer takes place in less time than the period during which a single count can be accumulated in said one register by said counting mechanism.

5. A pulse counting device provided with visual and electrical storage and readout comprising;

(a) a pair of visually readable registers disposed in an enclosure in the upper and lower portion thereof, (b) one of said registers being connected to a counting mechanism for accumulating incoming pulse counts, (c) the other of said registers being provided with a plurality of dials and a coded disk on each dial, (d) means interconnecting said registers to transfer the reading of said one register to said other register, (1) said means including camming means on said other register cooperating with contact means on said one register, (e) transfer means electrically actuated to operate said interconnecting means whereby the count accumulated in said one register is transferred to said other register, and (f) contact means engagable with said coded disks of said other register to provide an electrical indication of the count transferred to said other register.

6. A pulse counting device provided with visual and electrical storage and readout comprising;

(a) a pair of visually readable registers disposed in an enclosure in the upper and lower portion thereof, (b) one of said registers being connected to a counting mechanism for accumulating incoming pulse counts, (c) the other of said registers providing visual and electrical storage and readout of counted pulses, (1) said other register having a plurality of dials with a coded disk on each dial, (d) means interconnecting said registers to transfer the reading of said one register to said other register, (1) said means including camming means on said other register cooperating with contact means on said one register, (e) transfer means electrically actuated to operate said interconnecting means whereby the count accumulated in said one register is transferred to said other register, and (f) contact means engagable with said coded disks to provide an electrical indication of the count transferred to said other register.

7. A pulse counting device provided with visual and electrical storage and readout comprising;

(a) a pair of visually readable registers disposed in an enclosure in the upper and lower portion thereof, (b) one of said registers being connected to a counting mechanism for accumulating incoming pulse counts, (c) the other of said registers providing visual and electrical storage and readout of counted pulses, (1) said other registers having a plurality of dials with a coded disk on each dial, (d) means interconnecting said registers to transfer the reading of said one register to said other register, (1) said means including camming means on said other register cooperating with contact means on said one register, (e) transfer means electrically actuated to operate said interconnecting means whereby the count accumulated in said one register is transferred to said other register, (f) contact means engageable with said coded disks to provide an electrical indication of the count transferred to said other register, and (g) locking means interconnected with said transfer means for preventing operation of said counting mechanism, (1) said locking means being actuated by said transfer means during transfer.

8. A pulse counting device provided with visual and electrical storage and readout comprising;

(a) a pair of visually readable registers disposed in an enclosure in the upper and lower portion thereof, (b) one of said registers having a plurality of digital dials of ascending order and being connected to a counting mechanism for accumulating incoming pulse counts, (c) the other of said registers having another plurality of digital dials of ascending order providing visual and electrical storage and readout of counted pulses, (1) each of said other plurality of digital dials having a coded disk mounted thereon, (d) means interconnecting said registers to transfer the reading of said one register to said other register, (1) said means including rotatable shafts on which are fixed said plurality of dials of said one register with the plurality of dials of said other register being rotatably and slidably mounted on said shafts and camming means for rotating said plurality of dials on said other register, (2) said interconnecting means operating to move said other plurality of dials of said other register to register the count accumulated in the plurality of dials of said one register, (e) transfer means electrically actuated to operate said interconnecting means whereby the count accumulated in said one register is transferred to said other register, and (f) contact means engageable with said coded disks to provide an electrical indication of the count transferred to said other register.

9. A pulse counting device provided with visual and electrical storage and readout comprising;

(a) a pair of visually readable registers disposed in an enclosure in the upper and lower portion thereof, (b) one of said registers having a plurality of digital dials of ascending order and being connected to a counting mechanism for accumulating incoming pulse counts, (c) the other of said registers having another plurality of digital dials of ascending order providing visual and electrical storage and readout of counted pulses, (d) means interconnecting said registers to transfer the reading of said one register to said other register, (1) said means including rotatable shafts on which are fixed said plurality of dials of said one register with the plurality of dials of said other register being rotatably and slidably mounted on said shafts and camming means for rotating said plurality of dials on said other register, (2) said interconnecting means operating to move said other plurality of dials of said other register to register the count accumulated in said plurality of dials of said one register, (e) transfer means electrically actuated to operate said interconnecting means whereby the count accumulated in said one register is transferred to said other register.

10. A pulse counting device provided with visual and electrical storage and readout comprising;

(a) a pair of visually readable registers disposed in an enclosure in the upper and lower portion thereof, (b) one of said registers having a plurality of digital dials of ascending order and being connected to a counting mechanism for accumulating incoming pulse counts, (c) the other of said registers having another plurality of digital dials of ascending order providing visual and electrical storage and readout of counted pulses, (d) means interconnecting said registers to transfer the reading of said one register to said other register, (1) said means including rotatable shafts on which are fixed said plurality of dials of said one register with the plurality of dials of said other register being rotatably and slidably mounted on said shafts and camming means for rotating said plurality of dials on said other register, (2) said interconnecting means operating to move said other plurality of dials of said second register to register the count accumulated in said plurality of dials of said one register, (e) transfer means electrically actuated to operate said interconnecting means whereby the count accumulated in said one register is transferred to said other register, and (f) locking means interconnected with said transfer means for preventing operation of said counting mechanism, (1) said locking means being actuated by said transfer means during transfer.

11. A pulse counting device provided with visual and electrical storage and readout comprising;

(a) a pair of visually readable registers disposed in an enclosure in the upper and lower portion thereof, (b) one of said registers having a plurality of digital dials of ascending order and being connected to a counting mechanism for accumulating incoming pulse counts, (c) the other of said registers having another plurality of digital dials of ascending order providing visual and electrical storage and readout of counted pulses, (1) each of said other plurality of dials having a coded disk mounted thereon, (d) means interconnecting said registers to transfer the reading of said one register to said other register, (1) said means including rotatable shafts on which are fixed said plurality of dials of said one register with the plurality of dials of said other register being rotatably and slidably mounted on said shafts and camming means for rotating said plurality of dials on said other register, (2) said interconnecting means operating to move said other plurality of dials of said second register to register the count accumulated in said plurality of dials of said one register, (e) transfer means electrically actuated to operate said interconnecting means whereby the count accumulated in said one register is transferred to said other register, (f) locking means interconnected with said transfer means for preventing operation of said counting mechanism, (1) said locking means being actuated by said transfer means during transfer, and (g) contact means engageable with said coded disks to provide an electrical indication of the count transferred to said other register.

12. A pulse counting device provided with visual and electrical storage and readout comprising;

(a) a first register having a plurality of intermittently movable digital dials of ascending order;

(b) a counting mechanism for receiving incoming pulses, (1) said counting mechanism being connected to the lowest order dial of said plurality of dials to intermittently move said lowest order dial to accumulate said incoming pulses, (c) a gear train interconnecting said plurality of dials and operating to intermittently move said dials of ascending order to accumulate counts from dials of lower order, (d) a second register having a second plurality of digital dials of ascending order, (1) each of said second plurality of dials being of the same order as one dial of said plurality of dials of said first register, (e) means interconnecting each dial of said second register with the dial of said first register which is of the same order, (1) said means including rotatable shafts, each of said rotatable shafts having fixed thereto one dial of said first register with the same order dial of said second register being slidably and rotatably mounted thereon, (2) said interconnecting means having camming means for moving each dial of said second register to the same count indication as is present in said dial of said first register which is of the same order during a transfer operation, (f) a transfer means operated by a transfer signal, (1) said transfer means connected to said second register whereby operation of said transfer means actuates said second register to cause said means of said interconnecting means to move each said dial of said second register, (g) contact means engaging each said dial of said second register, (1) each said dial of said second register having a coded disk engaging said contact means whereby when said dials of said second register are moved to the same count indication as is present in said dials of said first register said contact means is actuated by said coded disks to provide an electrical indication of the count indicated by said dials of said second register, said dials of said second register visually and electrically storing said indicated count between transfer signals.

13. A pulse counting device provided with visual and electrical storage and readout comprising;

(a) a first register having a plurality of intermittently movable digital dials of ascending order;

(b) a counting mechanism for receiving incoming pulses, (1) said counting mechanism being connected to the lowest order dial of said plurality of dials to intermittently move said lowest order dial to accumulate said incoming pulses, (c) a gear train interconnecting said plurality of dials and operating to intermittently move said dials of ascending order to accumulate counts from dials of lower order, (d) a second register having a second plurality of digital dials of ascending order, (1) each of said second plurality of dials being of the same order as one dial of said plurality of dials of said first register, (e) means interconnecting each dial of said second register with the dial of said first register which is of the same order, (1) said means including rotatable shafts, each of said rotatable shafts having fixed thereto one dial of said first register with the same order dial of said second register being slidably and rotatably mounted thereon, (2) said interconnecting means having camming means for moving each dial of said second register to the same count indication as is present in said dial of said first register which is of the same order during a transfer operation, (f) a transfer means operated by a transfer signal, (1) said transfer means connected to said second register whereby operation of said transfer means actuates said second register to cause said means of said interconnecting means to move each said dial of said second register, (g) contact means engaging each dial of said second register, (1) each said dial of said second register having a coded disk engaging said contact means whereby when said dials of said second register are moved to the same count indication as is present in said dials of said first register said contact means is actuated by said coded disks to provide an electrical indication of the count indicated by said dials of said second register, said dials of said second register visually and electrically storing said indicated count between transfer signals, (h) locking means interconnected with said transfer means for preventing operation of said counting mechanism, (1) said locking means being actuated by said transfer means during said transfer operation.

14. A pulse counting device provided with a visual and electrical storage and readout comprising;

(a) a first register having a plurality of intermittently movable digital dials of ascending order, (b) a counting mechanism for receiving incoming pulses, (1) said counting mechanism being connected to the lowest order dial of said plurality of dials to intermittently move said lowest order dial to accumulate said incoming pulses, (c) a gear train interconnecting said plurality of dials and operating to intermittently move said dials of ascending order to accumulate counts from dials of lower order, (d) a second register having a second plurality of digital dials of ascending order, (1) each of said second plurality of dials being of the same order as one dial of said plurality of dials of said first register, (e) means interconnecting each dial of said second register with the dial of said first register which is of the same order, (1) said means including rotatable shafts, each of said rotatable shafts having fixed thereto one dial of said first register with the same order dial of said second register being slidably and rotatably mounted thereon, (2) said interconnecting means having camming means for moving each dial of said second register to the same count indication as is present in said dial of said first register which is of the same order during a transfer operation,
(f) a transfer means operated by a transfer signal,
(1) said transfer means connected to said second register whereby operation of said transfer means actuates said second register to cause said means of said interconnecting means to move each dial of said second register,
(g) contact means engaging each said dial of said second register,
(1) each said dial of said second register having a coded disk engaging said contact means whereby when said dials of said second register are moved to the same count indication as is present in said dials of said first register said contact means is actuated by said coded disks to provide an electrical indication of the count indicated by said dials of said second register, said dials of said second register visually and electrically storing said indicated count between transfer signals,
(h) centering means effective to center said plurality of dials of said first register when said dials are in the 9 position,
(1) said centering means being actuated by said transfer means during said transfer operation.

15. A pulse counting device provided with visual and electrical storage and readout comprising;
(a) a first register having a plurality of intermittently movable digital dials of ascending order,
(b) a counting mechanism for receiving incoming pulses,
(1) said counting mechanism being connected to the lowest order dial of said plurality of dials to intermittently move said lowest order dial to accumulate said incoming pulses,
(c) a gear train interconnecting said plurality of dials and operating to intermittently move said dials of ascending order to accumulate counts from dials of lower order,
(d) a second register having a second plurality of digital dials of ascending order,
(1) each of said second plurality of dials being of the same order as one dial of said plurality of dials of said first register,
(e) means interconnecting each dial of said second second register with the dial of said first register which is of the same order,
(1) said means including rotatable shafts, each of said rotatable shafts having fixed thereto one dial of said first register with the same order dial of said second register being slidably and rotatably mounted thereon,
(2) said interconnecting means having camming means for moving each dial of said second register to the same count indication as is present in said dial of said first register which is of the same order during a transfer operation,
(f) a transfer means operated by a transfer signal,
(1) said transfer means connected to said second register whereby operation of said transfer means actuates said second register to cause said means of said interconnecting means to move each said dial of said second register,
(g) contact means engaging each said dial of said second register,
(1) each said dial of said second register having a coded disk engaging said contact means whereby when said dials of said second register are moved to the same count indication as is present in said dials of said first register said contact means is actuated by said coded disks to provide an electrical indication of the count indicated by said dials of said second register, said dials of said second register visually and electrically storing said indicated count between transfer signals,
(h) centering means effective to center said plurality of dials of said first register when said dials are in their 9 position,
(i) locking means to prevent operation of said counting mechanism;

said centering means and said locking means being interconnected to said transfer means whereby said centering means and said locking means are actuated by said transfer means during said transfer operation.

16. A pulse counting device provided with visual and electrical storage and readout comprising;
(a) a first register having a plurality of intermittently movable digital dials of ascending order,
(b) a counting mechanism for receiving incoming pulses,
(1) said counting mechanism being connected to the lowest order dial of said plurality of dials to intermittently move said lowest order dial to accumulate said incoming pulses,
(c) a gear train interconnecting said plurality of dials and operating to intermittently move said dials of ascending order to accumulate counts from dials of lower order,
(d) a second register having a second plurality of digital dials of ascending order,
(1) each of said second plurality of dials being of the same order as one dial of said plurality of dials of said first register,
(e) means interconnecting each dial of said second register with the dial of said first register which is of the same order,
(1) said means including rotatable shafts, each of said rotatable shafts having fixed thereto one dial of said first register with the same order dial of said second register being slidably and rotatably mounted thereon,
(2) said interconnecting means having camming means for moving each dial of said second register to the same count indication as is present in said dial of said first register which is of the same order during a transfer operation,
(f) a transfer means operated by a transfer signal,
(1) said transfer means connected to said second register whereby operation of said transfer means actuates said second register to cause said means of said interconnecting means to move each said dial of said second register.

17. A pulse counting device provided with visual and electrical storage and readout comprising;
(a) a first register having a plurality of intermittently movable digital dials of ascending order,
(b) a counting mechanism for receiving incoming pulses,
(1) said counting mechanism being connected to the lowest order dial of said plurality of dials to intermittently move said lowest order dial to accumulate said incoming pulses,
(c) a gear train interconnecting said plurality of dials and operating to intermittently move said dials of ascending order to accumulate counts from dials of lower order,
(d) a second register having a second plurality of digital dials of ascending order,
(1) each of said second plurality of dials being of the same order as one dial of said plurality of dials of said first register,
(e) means interconnecting each dial of said second register with the dial of said first register which is of the same order,
(1) said means including rotatable shafts, each of said rotatable shafts having fixed thereto one dial of said first register with the same order dial of said second register being slidably and rotatably mounted thereon, (2) said interconnecting means having camming means for moving each dial of said second register to the same count indications as is present in said dial of said first register which is of the same order during a transfer operation, (f) a transfer means operated by a transfer signal, (1) said transfer means connected to said second register whereby operation of said transfer means actuates said second register to cause said means of said interconnecting means to move each said dial of said second register, (g) locking means interconnected with said transfer means for preventing operation of said counting mechanism, (1) said locking means being actuated by said transfer means during said transfer operation.

References Cited by the Examiner

UNITED STATES PATENTS

| | | | |
|---|---|---|---|
| 2,733,008 | 1/1956 | D'Andrea et al. | 235—92 |
| 2,922,574 | 1/1960 | Matthew | 235—61.61 |
| 2,966,670 | 12/1960 | Foss | 340—347 |

MAYNARD R. WILBUR, *Primary Examiner.*

J. F. MILLER, *Assistant Examiner.*